Aug. 29, 1967 J. WITT 3,338,537
PUMP MOUNTING FRAME IN EXTERNALLY INSULATED
THIN-WALLED TANKS OF TANKERS CARRYING
SUPERCOOLED LIQUID MEDIA
Filed Feb. 10, 1966 2 Sheets-Sheet 1
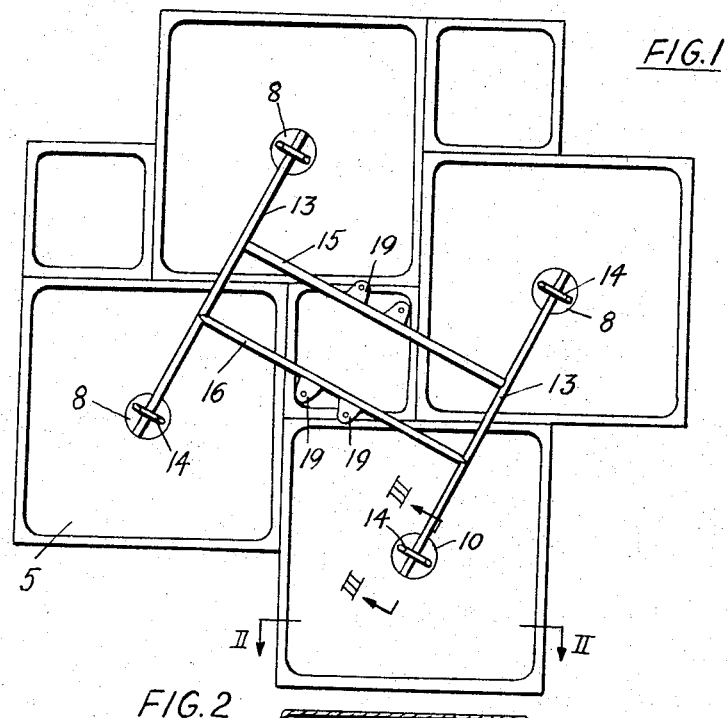
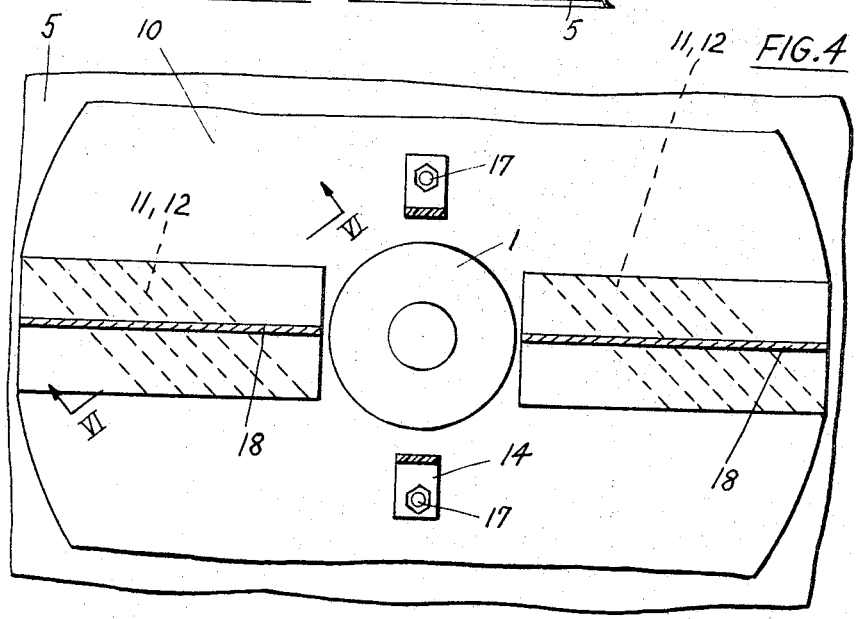
INVENTOR
Johannes Witt
BY
ATTORNEYS

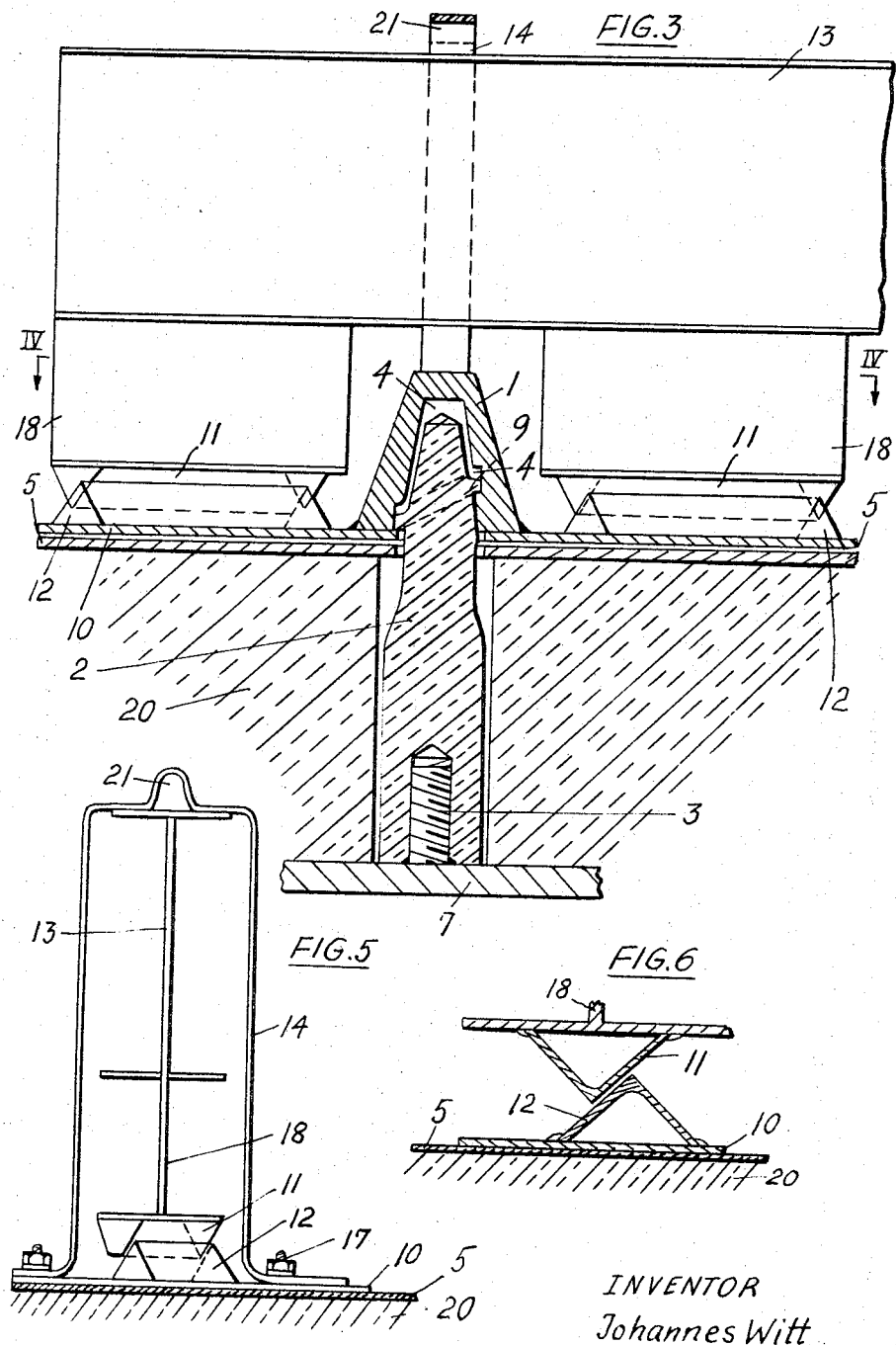

United States Patent Office 3,338,537
Patented Aug. 29, 1967

3,338,537
PUMP MOUNTING FRAME IN EXTERNALLY INSULATED THIN-WALLED TANKS OF TANKERS CARRYING SUPERCOOLED LIQUID MEDIA
Johannes Witt, Kiel-Dietrichsdorf, Germany, assignor to Kieler Howaldtswerke Aktiengesellschaft, Kiek-Dietrichsdorf, Germany, a firm
Filed Feb. 10, 1966, Ser. No. 526,505
Claims priority, application Germany, Feb. 15, 1965, K 55,286
4 Claims. (Cl. 248—19)

This invention relates to a pump mounting frame in externally insulated thin-walled tanks of tankers carrying super-cooled liquid media, in which the wall of the tank is formed of individual trough-shaped component parts and interpositioned expansion folds, compensators and the like.

Liquid-gas tanks are subjected to large variations in temperature. For example, the boiling point of methane is at −161° C. Thus, the trough-shaped component parts of the tank expand and contract through a relatively wide range. Consequently, the arrangement of mounting frames for pumps, degasification ventilators and other equipment in the tank, without forming cold-bridges through the external tank insulation, is a difficult task and only feasible in co-ordination with the expansion and contraction of the component parts of the tank.

It is the object of the present invention to overcome the above mentioned difficulties and to render the building in of thermoelastic mounting frames in thin-walled tanks simple and inexpensive.

To achieve this object, the present invention provides a pump mounting frame of the initially specified type which comprises four bearings, each of said bearings being arranged in the static centre of one of said trough-shaped component parts, respectively, two beams, each of said beams connecting two of said bearings at a time, transverse connecting members extending between said beams, a pair of oppositely arranged thermally movable displacement angles associated with each of said bearings in the longitudinal central axis of each of said beams, said displacement angles corresponding to the thermal geometry of the system, a supporting bolt disposed in the centre of each of said bearings for locking said trough-shaped component parts, and an elastic retaining strap associated with each of said supporting bolts for elastically fixing said beams in the regions of said supporting bolts.

The arrangement of this thermoelastic mounting frame between adjacent trough-shaped component parts of the tank is such that it will not be impaired by expansion or contraction of the trough-shaped component parts and will be capable of absorbing torques generated, for example, by pumps.

An embodiment of the invention will now be described by way of example and with reference to the accompanying drawings, in which:

FIG. 1 is a top plan view of a plurality of trough-shaped component parts of a tank with a pump mounting frame according to the invention fixed thereon, as seen from within the tank;

FIG. 2 is a section taken on the line II—II of FIG. 1;

FIG. 3 is a section, on an enlarged scale, taken on the line III—III of FIG. 1;

FIG. 4 is a section taken on the line IV—IV of FIG. 3;

FIG. 5 is a side elevational view of FIG. 3, and

FIG. 6 is a section through a pair of displacement angles, taken on the line VI—VI of FIG. 4.

In tankers, the liquid-gas tanks are assembled, as is known, from individual trough-shaped component parts and interpositioned expansion folds, compensators and the like. The tanks are externally insulated and may be of the most different dimensions and shapes.

Referring now to the drawings, FIG. 1 shows a plurality of trough-shaped component parts 5 supporting a pump mounting frame of the invention which, however, may also be used for the mounting of other devices, such as degasification ventilators, and which comprises four bearings 8 each of which is arranged in the static centre of a respective one of the trough-shaped component parts 5. Two bearings 8 at a time are connected by a beam 13 and between the two beams 13 there extend two spaced parallel transverse connecting members 15 and 16 each of which is provided with a pair of mounting lugs 19.

As shown in FIGS. 3 through 6, the bearings 8 are each associated with a pair of oppositely arranged thermally movable displacement angles 11 and 12 disposed in the longitudinal central axis of the respective beam 13 and corresponding to the thermal geometry of the system. The displacement angles 12 are secured to a distributing ring 10, whereas the opposite displacement angles 11 are fixed to spacers 18 of the beams 13.

Referring to FIG. 3, a supporting bolt 2 is arranged in the centre of each of the bearings 8, for thermoelastically locking the trough-shaped component parts 5 which are provided with an external insulation 20. The supporting bolts 2 are made of a material of low thermal conductivity and each of them is fixed at one of its ends, and by means of a screw bolt 3, to the double bottom 7 or to another wall of the ship, while its other end is inserted and guided in a nut 1 provided on the respective distributing ring 10. The guidance of the supporting bolt 2 in the nut 1 is obtained by means of a special thread 9 having a play 4.

The function of the supporting bolts 2 is to lock the trough-shaped component parts 5 during contracting and to absorb all horizontal components of the load. The vertical stress is transmitted through the distributing rings 10 into the insulation and owing to the play 4 in the thread 9 no load is transmitted to the bolts 2. All vertical loads are thus directly transmitted into the insulation 20.

The whole mounting frame is held by the displacement angles 11 and 12 so as to be stationary but thermally movable. The spacers 18 support the mounting frames 13, 15 and 16 at a level above the expension folds of the trough-shaped component parts 5 and symmetrically transmit the bearing pressure into the distributing rings 10 so that the play 4 in the nut 1 will not be impaired by any tilting that might occur.

Associated with each bearing 8 is an elastic retaining strap 14 arranged in the region of the respective supporting bolt 2. The straps 14 elastically fix the beams 13 in position, while being rigid with respect to upwardly directed vertical forces (deceleration). At the occurrence of thermal movement, elasticity is ensured by a fold 21 of the retaining strap 14, which latter is secured to the distributing ring 10 by means of bolts 17.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

I claim:

1. A pump mounting frame in externally insulated thin-walled tanks of tankers carrying supercooled liquid media, in which the wall of the tank is formed of individual trough-shaped component parts and interpositioned expansion folds, compensators and the like, comprising four bearings, each of said bearings being arranged in the static centre of one of said trough-shaped component parts, respectively, two beams, each of said beams connecting two of said bearings at a time, transverse connecting members extending between said beams, a pair of oppositely arranged thermally movable displacement angles associated with each of said bearings in the longitudinal central axis of each of said beams, said displacement angles corresponding to the thermal geometry of the system, a supporting bolt disposed in the centre of each of said bearings for locking said trough-shaped component parts, and an elastic retaining strap 14 associated with each of said supporting bolts for elastically fixing said beams in the regions of said supporting bolts.

2. A pump mounting frame as claimed in claim 1, wherein each of said bearings comprises a distributing ring and each of said beams is provided with spacers, one of said oppositely arranged thermally movable displacement angles of each pair thereof being secured to one of said distributing rings, respectively, whereas the opposite one of said displacement angles of each pair thereof is secured to one of said spacers, respectively.

3. A pump mounting frame as claimed in claim 1, wherein said supporting bolts are made of a material of low heat conductivity.

4. A pump mounting frame as claimed in claim 2 wherein said distributing rings are each provided with a nut extending into the interior of said tank and each of said supporting bolts is fixed to the double bottom or a wall of the ship and guided in one of said nuts, respectively, through the intermediary of a thread affording a certain play.

No references cited

ROY D. FRAZIER, *Primary Examiner.*

F. DOMOTOR, *Assistant Examiner.*